(12) United States Patent
Podszun et al.

(10) Patent No.: US 6,221,287 B1
(45) Date of Patent: Apr. 24, 2001

(54) PROCESS FOR THE PREPARATION OF CROSSLINKED SPHERICAL POLYMERS

(75) Inventors: Wolfgang Podszun; Olaf Halle, both of Köln; Werner Strüver, Leverkusen; Robert Bloodworth; Holger Lütjens, both of Köln, all of (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/326,047

(22) Filed: Jun. 4, 1999

(30) Foreign Application Priority Data

Jun. 12, 1998 (DE) .............................. 198 26 049

(51) Int. Cl.$^7$ .............................. B01J 13/02; B05D 7/00; B32B 15/02; B32B 17/02; B32B 19/00

(52) U.S. Cl. ................ 264/4.7; 427/213.34; 428/402.21; 428/402.22; 428/402.24

(58) Field of Search ...................... 264/4.7; 427/213.34; 428/402.21, 402.22, 402.24

(56) References Cited

U.S. PATENT DOCUMENTS

| 4,283,499 | | 8/1981 | Howell | 521/38 |
|-----------|---|--------|--------|--------|
| 5,932,152 | * | 8/1999 | Podszun et al. | 264/4.1 |
| 5,972,508 | * | 10/1999 | Boeckh et al. | 428/402.2 |

* cited by examiner

*Primary Examiner*—Nathan M. Nutter
(74) *Attorney, Agent, or Firm*—Joseph C. Gil; Richard E.L. Henderson

(57) ABSTRACT

This invention relates to suspension polymers having high swellability have low contents of soluble fractions prepared using aliphatic peroxyesters as polymerization initiators.

3 Claims, No Drawings

PROCESS FOR THE PREPARATION OF CROSSLINKED SPHERICAL POLYMERS

BACKGROUND OF THE INVENTION

The invention relates to a process for the preparation of crosslinked spherical polymers having high swellability and low contents of soluble fractions using peroxyesters as polymerization initiators.

Ion exchangers having as uniform a particle size as possible (referred to below as "monodisperse") have very recently become increasingly important because economic advantages can be obtained in many applications due to the more advantageous hydrodynamic properties of an exchanger bed of monodisperse ion exchangers. Monodisperse ion exchangers can be obtained by functionalization of monodisperse bead polymers.

One possible method for preparing monodisperse bead polymers is the so-called seed/feed process, in which a monodisperse polymer ("seed") is swollen in the monomer and then polymerized. Seed/feed processes are described, for example, in European Patent Applications 98,130 and 101,943

Seed polymers should have a high swelling index so that they are capable of absorbing a large amount of the added monomer in the seed/feed process. The swelling index ("SI") is defined as the quotient of the volume of the swollen polymer and the volume of the polymer that is not swollen. The swelling index can be controlled in a known manner by the content of crosslinking agent: low contents of crosslinking agent lead to high swelling indices and vice versa. Thus, for example, styrene polymers that are crosslinked with 0.8 to 2.0% by weight of divinylbenzene have swelling indices of 2.5 to 8 in toluene. However, seed polymers having a low degree of crosslinking have a very high fraction of uncrosslinked, soluble polymers. This fraction of uncrosslinked soluble polymers in the seed polymer is undesired in many respects:

1. The polymerization of the swollen seed can be impaired because the polymer fractions dissolved from the seed by the added monomer cause the particles to adhere to one another.
2. The functionalization for the preparation of the ion exchangers can be complicated because the dissolved-out polymer fractions accumulate in the reaction solutions used for the functionalization.
3. The end products (i.e., ion exchangers) may contain large amounts of soluble polymers, which may lead to undesired bleaching of the ion exchangers.

The object of the present invention is to provide crosslinked spherical polymers having high swellability and low contents of soluble fractions.

It has now been found that polymers having low contents of crosslinking agent and correspondingly high swellability have particularly low contents of soluble polymer fractions when peroxyesters are used as initiators in their preparation.

SUMMARY OF THE INVENTION

The present invention relates to a process for the preparation of crosslinked spherical polymers comprising suspension polymerizing a mixture of
(a) 96.5 to 99.0% by weight (preferably 97.3 to 99.0% by weight) of a monomer having one C=C double bond capable of free radical polymerization per molecule,
(b) more than 0.8% by weight to not more than 2.5% by weight (preferably more than 0.8% by weight to 1.5% by weight, particularly preferably 0.801% by weight to 1.5% by weight, very particularly preferably 0.801% by weight to 1.0% by weight, especially preferably 1.0% by weight) of a crosslinking agent containing two or more (preferably two to four) double bonds capable of free radical polymerization per molecule, and
(c) 0.2 to 1.0% by weight of at least one aliphatic peroxyester as polymerization initiator,
the percentages being based on the sum of the components (a) to (c).

DETAILED DESCRIPTION OF THE INVENTION

For the purposes of the invention, monomers (a) are compounds having one C=C double bond capable of free radical polymerization per molecule. Preferred compounds of this type include aromatic monomers, such as vinyl and vinylidene derivatives of benzene and of naphthalene (for example, vinylnaphthalene, vinyltoluene, ethylstyrene, α-methyl-styrene, chlorostyrenes, and, preferably, styrene) and nonaromatic vinyl and vinylidene compounds, such as acrylic acid, methacrylic acid, $C_1$–$C_8$ alkyl acrylates, $C_1$–$C_8$ alkyl methacrylates, acrylonitrile, methacrylonitrile, acrylamide, methacrylamide, vinyl chloride, vinylidene chloride, and vinyl acetate. The nonaromatic monomers are preferably used in amounts of 0.1 to 50% by weight (particularly 0.5 to 20% by weight) based on aromatic monomers. In most cases, however, exclusively aromatic monomers are used.

Suitable crosslinking agents (b) are compounds that contain two or more (preferably two to four) double bonds capable of free radical polymerization per molecule. Examples of suitable crosslinking agents (b) include, for example, divinylbenzene, divinyltoluene, trivinylbenzene, divinylnaphthalene, trivinylnaphthalene, diethylene glycol divinyl ether, 1,7-octadiene, 1,5-hexadiene, ethylene glycol dimethacrylate, triethylene glycol dimethacrylate, trimethylolpropane trimethacrylate, allyl methacrylate, and methylene-N,N'-bisacrylamide. Divinylbenzene is preferably used as the crosslinking agent. For most applications, commercial divinylbenzene qualities which also contain ethylvinylbenzene in addition to the isomers of divinylbenzene, are sufficient.

Aliphatic peroxyesters (c) correspond to the formulas I, II, or III

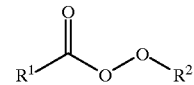

Formula I

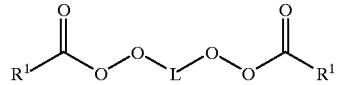

Formula II

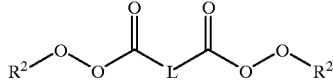

Formula III in which
$R^1$ denotes an alkyl radical having 2 to 20 carbon atoms or a cycloalkyl radical having up to 20 carbon atoms,
$R^2$ denotes a branched alkyl radical having 4 to 12 carbon atoms, and
L denotes an alkylene radical having 2 to 20 carbon atoms or a cycloalkylene radical having up to 20 carbon atoms.

Preferred aliphatic peroxyesters according to the formula I include, for example, tert-butyl peroxyacetate, tert-butyl peroxyisobutyrate, tert-butyl peroxypivalate, tert-butyl peroxyoctanoate, tert-butyl peroxy-2-ethylhexanoate, tert-butyl peroxyneodecanoate, tert-amyl peroxypivalate, tert-amyl peroxyoctanoate, tert-amyl peroxy-2-ethylhexanoate, and tert-amyl peroxyneodecanoate.

Preferred aliphatic peroxyesters according to the formula II include, for example, 2,5-bis(2-ethylhexanoylperoxy)-2, 5-dimethylhexane, 2,5-dipivaloyl-2,5-dimethylhexane, and 2,5-bis(2-neodecanoylperoxy)-2,5-dimethylhexane.

Preferred aliphatic peroxyesters according to the formula III include, for example, di-tert-butyl peroxyazelate and di-tert-amyl peroxyazelate.

The term suspension polymerization is understood to mean a process in which a monomer phase, which contains an initiator that is soluble in the monomer, is dispersed in the form of droplets in a phase that is essentially immiscible with the monomer, and is cured by increasing the temperature while stirring. Further details of the suspension polymerization are described, for example, in the publication *Polymer Processes,* edited by C. E. Schildknecht, published in 1956 by Interscience Publishers, Inc. New York, in the chapter "Polymerization in Suspension" at pages 69 to 109. In the present invention, the phase that is essentially immiscible with the monomer is preferably an aqueous phase.

In a preferred embodiment of the present invention, the mixture of vinylaromatic monomer (a), crosslinking agent (b), and aliphatic peroxyester (c) is microencapsulated.

The materials known for this intended use, particularly polyesters, natural and synthetic polyamides, polyurethanes, and polyureas, are suitable for the microencapsulation. Gelatin is particularly suitable as a natural polyamide and is used in particular as a coacervate and complex coacervate. For the purposes of the invention, gelatin-containing complex coacervates are understood to mean in particular combinations of gelatin and synthetic polyelectrolytes. Suitable synthetic polyelectrolytes are copolymers having incorporated units of, for example, maleic acid, acrylic acid, methacrylic acid, acrylamide, and methacrylamide. Gelatin-containing capsules can be hardened using conventional curing agents, such as, for example, formaldehyde or glutardialdehyde. The encapsulation of monomer droplets, for example, with gelatin, gelatin-containing coacervates, and gelatin-containing complex coacervates, is described in detail in European Patent Application 46,535. Methods for encapsulation with synthetic polymers are known. For example, the phase boundary condensation in which a reactive component (for example, an isocyanate or acid chloride) dissolved in the monomer droplet is reacted with a secondary reaction component (for example, an amine) dissolved in the aqueous phase is suitable.

It has been found that microencapsulated crosslinked polymers having a swelling index of 2.5 to 7.5, preferably 3.0 to 6 (measured in toluene at 25° C.), and a content of soluble fraction (measured by extraction with tetrahydrofuran) of less than 1.0% by weight are particularly suitable as seed polymers for seed/feed processes.

The process according to the invention is also suitable for the preparation of monodisperse spherical polymers, in particular those according to European Patent Application 46,535. The aqueous phase then expediently contains one or more protective colloids. Preferred protective colloids are natural and synthetic water-soluble polymers, such as, for example, gelatin, starch, polyvinyl alcohol, polyvinylpyrrolidone, polyacrylic acid, polymethacrylic acid, and copolymers of acrylic acid, methacrylic acid, methacrylates, and acrylates. Cellulose derivatives, in particular cellulose esters and cellulose ethers, such as methylhydroxyethylcellulose, methylhydroxypropylcellulose, hydroxyethylcellulose, and carboxymethylcellulose, are also very suitable. Gelatin is particularly suitable as the protective colloid for the polymerization of monomer droplets encapsulated with gelatin or gelatin-containing complex coacervates. The amount of protective colloids used is in general 0.02 to 1% by weight (preferably 0.05 to 0.3% by weight) based on the aqueous phase. The aqueous phase may moreover contain a buffer system. Buffer systems which adjust the pH of the aqueous phase at the beginning of the polymerization to a value between pH 14 and 6 (preferably between pH 12 and 8) are preferred. Under these conditions, protective colloids having carboxyl groups are present completely or partially as salts. In this way, the action of the protective colloids is advantageously influenced. Particularly suitable buffer systems contain phosphate or borate salts. For the purposes of the invention, the terms phosphate and borate also include the condensates of the ortho forms of corresponding acid and salt. The concentration of phosphate or borate in the aqueous phase is 0.5 to 500 mMol/l (preferably 5 to 100 mMol/l).

The aqueous phase can also contain a dissolved polymerization inhibitor. Suitable inhibitors include both inorganic and organic substances. Examples of inorganic inhibitors are nitrogen compounds, such as hydroxylamine, hydrazine, sodium nitrite, and potassium nitrite. Examples of organic inhibitors are phenolic compounds, such as hydroquinone, hydroquinone monomethyl ether, resorcinol, pyrocatechol, tert-butylpyrocatechol, and condensates of phenols with aldehydes. Further organic inhibitors include nitrogen-containing compounds, such as, for example, diethylhydroxylamine and isopropylhydroxylamine. The concentration of the inhibitor is 5 to 1000 ppm (preferably 10 to 500, particularly preferably 20 to 250 ppm) based on the aqueous phase.

The volume ratio of monomer phase to the aqueous phase is in general 1:0.75 to 1:20 (preferably 1:1 to 1:6).

The polymerization temperature depends on the decomposition temperature of the initiator used. It is in general between 50 and 150° C., preferably between 55 and 100° C. The polymerization takes 0.5 hour to a few hours. It has proved useful to use a temperature program if the polymerization is started at a low temperature, for example 70° C., and the reaction temperature is increased with progressive conversion in the polymerization.

After the polymerization, the polymer can be isolated by customary methods, for example, by filtration or decanting, and, optionally after one or more washes, can be dried.

The prior art has not suggested the invention. European Patent Application 98,130 recommends amounts of 0.1 to 3% by weight of a crosslinking agent, but dibenzoyl peroxide is used as a polymerization initiator in the examples. European Patent Application 101,943 recommends amounts of 0.05 to 12.5% by weight of a crosslinking agent, but tert-butyl peroxybenzoate is used in the examples.

For the preparation of ion exchangers having improved pressure stability, the use of peroxyesters or peroxycarbonates as initiator is claimed in German Patent Application 2,827,475. However, this publication does not recommend the use of polymers prepared with aliphatic peroxyesters as seed for seed/feed polymers. The preparation of slightly crosslinked polymers having a very low content of extractables did not appear possible to date.

The invention therefore furthermore relates to crosslinked polymers having a swelling index of 2.5 to 7.5, preferably 3.0 to 6 (measured in toluene at 25° C.; the same swelling indices are obtained using styrene), and a content of soluble fraction (measured by extraction with tetrahydrofuran) of less than 1.0% by weight.

The following examples further illustrate details for the process of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all percentages are percentages by weight.

EXAMPLES

Soluble Fractions

To determine the soluble fractions, 5 to 7 g of bead polymer are weighed into an extraction thimble and extracted overnight with 800 ml of toluene in a Soxhlet apparatus (bath temperature 140° C.). The extract was filtered over a suction filter with a Schwarzband filter and evaporated down to about 1 ml in a rotary evaporator. Thereafter, 300 ml of methanol were added and drying was carried out in vacuo in a rotary evaporator to constant weight. A double determination was carried out for each sample.

Swelling

The swelling of the bead polymers was determined in toluene (and in some cases also in THF and styrene at room temperature). For this purpose, 10 ml of dried, sieved bead polymer were weighed into a 100 ml glass cylinder. The quotient of the volume of the bed ($V_0$) and the weighed-in amount (m) gave the bulk volume ($V_{bulk}$). The glass cylinder was filled to 100 ml with the swelling agent and left to stand for 10 to 20 hours. Shaking was carried out frequently and it was ensured that any air bubbles occurring could escape. The volume of the swollen bed was read and gave $V_1$. By definition, the quotient of $V_1$ and $V_0$ is the volume swelling index ($SI_{v/v}$).

Example 1
Comparative Example

Into 1500 ml of demineralized water initially introduced into a three-liter glass reactor was dissolved 10 g of disodium hydrogen phosphate decahydrate, 0.03 g of sodium nitrite, and 3 g of methylcellulose (Tylose MH 50) at room temperature. A mixture of x g of styrene, y g of commercial divinylbenzene (80% divinylbenzene, 20% ethylstyrene), and 5 g of dibenzoyl peroxide (100% strength) was added with stirring at 350 rpm. A stream of 20 L/h of nitrogen was passed into the reaction vessel. The batch was kept first at 75° C. for 10 hours and then at 95° C. for 1 hour and was then cooled to room temperature. The solid was isolated with the aid of a sieve (50 μm mesh size), washed several times with water, and dried at 75° C. in a drying oven. 950 g of bead polymer having a mean particle size of about 250 μm were obtained.

The swelling index was determined in toluene at 25° C. The soluble fractions were determined by extraction for six hours with tetrahydrofuran in a Soxhlet extractor.

| Ex. | Amount of styrene (x) | Amount of DVB (y) | SI | Soluble fractions |
|---|---|---|---|---|
| 1A | 990 g | 10 g | 5.0 | 3.6% |
| 1B | 985 g | 15 g | 3.9 | 2.9% |
| 1C | 980 g | 20 g | 3.5 | 2.2% |

Example 2
According to the Invention

Example 1 was repeated using tert-butyl peroxy-2-ethylhexanoate instead of dibenzoyl peroxide. 955 g of bead polymer having a mean particle size of about 250 μm were obtained.

| Ex. | Amount of styrene (x) | Amount of DVB (y) | SI | Soluble fractions |
|---|---|---|---|---|
| 2A | 990 g | 10 g | 4.6 | 0.5% |
| 2B | 985 g | 15 g | 3.9 | 0.3% |
| 2C | 980 g | 20 g | 3.4 | 0.2% |

What is claimed is:

1. A process for the preparation of crosslinked spherical polymers comprising suspension polymerizing a mixture of (a) 96.5 to 99.0% by weight of a monomer having one C=C double bond capable of free radical polymerization per molecule, (b) more than 0.8% by weight to not more than 2.5% by weight of a crosslinking agent containing two or more double bonds capable of free radical polymerization per molecule, and (c) 0.2 to 1.0% by weight of at least one aliphatic peroxyester as polymerization initiator, the percentages being based on the sum of the components (a) to (c).

2. A process according to claim 1 wherein the aliphatic peroxyester corresponds to the formulas I, II, or III

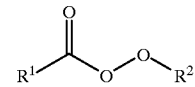

Formula I

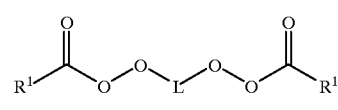

Formula II

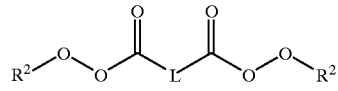

Formula III in which $R^1$ denotes an alkyl radical having 2 to 20 carbon atoms or a cycloalkyl radical having up to 20 carbon atoms, $R^2$ denotes a branched alkyl radical having 4 to 12 carbon atoms, and L denotes an alkylene radical having 2 to 20 carbon atoms or a cycloalkylene radical having up to 20 carbon atoms.

3. A process according to claim 1 wherein the mixture of components (a), (b), and (c) is microencapsulated.

* * * * *